United States Patent
Tabata et al.

[11] Patent Number: 5,900,686
[45] Date of Patent: May 4, 1999

[54] ELECTRIC MOTOR VEHICLE

[75] Inventors: Kunio Tabata; Minoru Kozaki; Issei Yamakoshi; Kunihiko Takagi; Yoshikazu Koike, all of Suwa; Takeo Sato, Yokohama; Nobuki Sasaki, Yokohama; Atsushi Mizukoshi, Yokohama, all of Japan

[73] Assignees: Seiko Epson Corporation; Tokyo R & D Co., Ltd., both of Tokyo, Japan

[21] Appl. No.: 08/335,707

[22] PCT Filed: May 11, 1993

[86] PCT No.: PCT/JP93/00620

§ 371 Date: Dec. 8, 1994

§ 102(e) Date: Dec. 8, 1994

[87] PCT Pub. No.: WO93/23266

PCT Pub. Date: Nov. 25, 1993

[30] Foreign Application Priority Data

| Sep. 9, 1902 | [JP] | Japan | 4-240921 |
| Sep. 9, 1902 | [JP] | Japan | 4-240922 |
| May 12, 1992 | [JP] | Japan | 4-119127 |
| Sep. 8, 1992 | [JP] | Japan | 4-239695 |
| Sep. 8, 1992 | [JP] | Japan | 4-239696 |
| Sep. 9, 1992 | [JP] | Japan | 4-240912 |
| Sep. 9, 1992 | [JP] | Japan | 4-240913 |
| Sep. 9, 1992 | [JP] | Japan | 4-240914 |
| Sep. 9, 1992 | [JP] | Japan | 4-240915 |
| Sep. 9, 1992 | [JP] | Japan | 4-240916 |
| Sep. 9, 1992 | [JP] | Japan | 4-240917 |
| Sep. 9, 1992 | [JP] | Japan | 4-240918 |
| Sep. 9, 1992 | [JP] | Japan | 4-240919 |
| Sep. 9, 1992 | [JP] | Japan | 4-240920 |
| Sep. 24, 1992 | [JP] | Japan | 4-254892 |
| Sep. 29, 1992 | [JP] | Japan | 4-283720 |
| Sep. 29, 1992 | [JP] | Japan | 4-283721 |

[51] Int. Cl.$^6$ .................................................. H02K 11/00
[52] U.S. Cl. ............................................. 310/71; 310/68 B
[58] Field of Search ................................. 310/85, 88, 71, 310/89, 68 B; 180/65.1, 65.6

[56] References Cited

U.S. PATENT DOCUMENTS

| 2,615,937 | 10/1952 | Ludwig et al. | 310/88 |
| 3,166,685 | 1/1965 | Hargreaves | 310/88 |
| 3,555,319 | 1/1971 | Schaefer | 310/88 |
| 3,725,707 | 4/1973 | Leimbach et al. | 310/71 |
| 3,748,511 | 7/1973 | Crabb | 310/71 |
| 3,760,339 | 9/1973 | Marshall | 310/71 |
| 3,976,965 | 8/1976 | Remus | 336/120 |
| 4,105,907 | 8/1978 | Hagenlocher et al. | 310/232 |
| 4,821,691 | 4/1989 | Ueno et al. | 123/185 B |
| 4,961,018 | 10/1990 | Akhter | 310/87 |
| 5,222,572 | 6/1993 | Yamagiwa et al. | 180/222 |

FOREIGN PATENT DOCUMENTS

| 42-19153 | 11/1967 | Japan . |
| 49-92719 | 8/1974 | Japan . |
| 55-5044 | 1/1980 | Japan . |
| 55-43334 | 3/1980 | Japan . |
| 55-63494 | 5/1980 | Japan . |
| 55-148391 | 10/1980 | Japan . |
| 55-152578 | 11/1980 | Japan . |
| 56-57684 | 5/1981 | Japan . |
| 56-86059 | 7/1981 | Japan . |

(List continued on next page.)

*Primary Examiner*—Clayton LaBalle
*Attorney, Agent, or Firm*—Kanesaka & Takeuchi

[57] ABSTRACT

An electric motor vehicle includes a motor case having first and second hollow section, with the first hollow section having a smaller diameter than that of the second hollow section, forming a step between the first and second hollow sections; a stator provided in the second hollow section and having an end engaged with the step; a motor cover having a cylindrical projection in sliding relationship to the second hollow section and sufficiently long to press the stator against the step and provide a space between the motor case and the motor cover for a minimum thickness of the stator; and a filler made of a liquid packing provided in the space between the motor case and the motor cover for sealing the motor against winds and rains.

4 Claims, 9 Drawing Sheets

FOREIGN PATENT DOCUMENTS

| | | |
|---|---|---|
| 56-169765 | 12/1981 | Japan . |
| 57-101551 | 6/1982 | Japan . |
| 57-115555 | 7/1982 | Japan . |
| 58-156393 | 10/1983 | Japan . |
| 59-107582 | 7/1984 | Japan . |
| 60-11601 | 1/1985 | Japan . |
| 60-69503 | 5/1985 | Japan . |
| 60-134498 | 7/1985 | Japan . |
| 61-159896 | 10/1986 | Japan . |
| 62-77845 | 4/1987 | Japan . |
| 62-88444 | 6/1987 | Japan . |
| 62-125349 | 8/1987 | Japan . |
| 63-3645 | 1/1988 | Japan . |
| 63-24956 | 2/1988 | Japan . |
| 63-48363 | 4/1988 | Japan . |
| 63-174531 | 7/1988 | Japan . |
| 63-162327 | 7/1988 | Japan . |
| 64-22531 | 2/1989 | Japan . |
| 1-282584 | 11/1989 | Japan . |
| 1-286781 | 11/1989 | Japan . |
| 1-171564 | 12/1989 | Japan . |
| 2-97234 | 4/1990 | Japan . |
| 4-4703 | 1/1992 | Japan . |
| 4-34835 | 3/1992 | Japan . |

ELECTRIC MOTOR VEHICLE

TECHNICAL FIELD

This invention relates to an electric motor vehicle using a motor as a drive motive power, and particularly to an electric motor vehicle which is preferably applied to two wheelers and three wheelers such as motorcycles and scooters.

BACKGROUND ART

It is now said to be an age of electric motor vehicles. It is said that the electric motor vehicles will solve most of the environmental issues such as the exhaust gas from automobiles which is said to make up about 70% of air pollution, noises, or the like, and will extend the life of oil resources by two times or more.

Known electric motor vehicles are provided as their drive system with a battery, a motor, and a controller for controlling the speed of the motor, and a wheel is rotated by a drive transmission mechanism like conventional automobiles, or a wheel is rotated by a motor disposed on it without necessitating such a drive transmission mechanism like conventional automobiles. And, in developing an electric motor vehicle, the improvement of the performance of an onboard battery is an issue to be solved and it will not be long before it is solved.

Incidentally, the electric motor vehicle is also demanded to have its safety improved together with the improvement of its performance. A mere replacement of the drive motive power of a conventional gasoline automobile by a motor can not sufficiently provide the safety of the electric motor vehicle. Specifically, the electric motor vehicle uses electricity for a drive source, and the power is a motor which rotates at a high speed as compared with an engine. Therefore, a trouble of the electric system or a failure of the motor may suddenly stop a running vehicle or suddenly start a vehicle which was out of action. Besides, in common to a running vehicle and a stopping vehicle, there is a possibility that a driver or a mechanic may suffer from an electric shock, be caught by the drive unit in the vicinity of the motor, or break the motor or the controller when servicing. These troubles or the necessity of protection is caused due to the device or structure peculiar in the electric motor vehicle, which is not seen in conventional automobiles.

The inventors involved in the development of an electric motor vehicle propose the following points to prevent accidents or failures form occurring and to assure safety.

First point for safety: To avoid a travel motion trouble of the electric motor vehicle which may suddenly occur when traveling, for example, a sudden stop of the electric motor vehicle.

When the vehicle is exposed to wind and rain and suffers from vibration when traveling, water may enter the motor or the electric control circuit, causing an insulation failure (electrical short). This is very dangerous because it leads to a stop of the electrical motor vehicle. In this connection, the improvement of a stator fixing structure, a motor case structure will be proposed.

SUMMARY OF THE INVENTION

Figure 11:
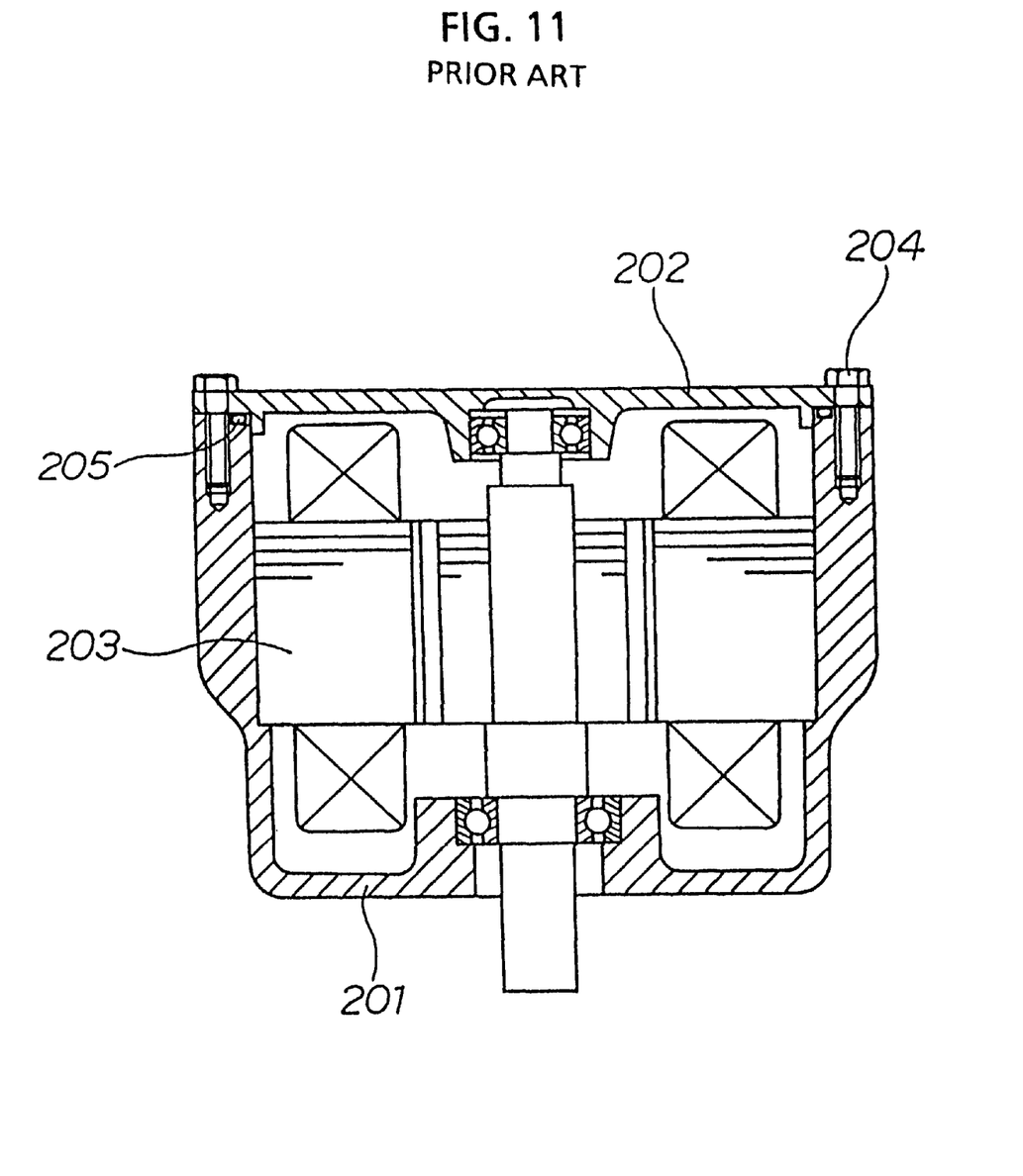
FIG. 11 is a vertical sectional view of a conventional motor.

A conventional motor is known to have a structure to prevent the entry of water from outside as shown in FIG. 11. As shown in FIG. 11, it is known that a stator 203 is fixed to a motor case 201 by shrinkage fitting or press fitting, and an O-ring 205 is fitted at an engagement section of the motor case 201 is fitted at an engagement section of the motor case 201 and a motor cover 202. And, when a fastening bolt 204 is turned to tighten the motor cover 202 against the motor case 201, the O-ring 205 is adequately crushed to seal the motor case 201 and the motor cover 202.

The above conventional structure has a drawback that machining is difficult because holes of the motor case for fitting the stator have to be machined accurately, though sealing properties are good. And, since assembling needs two steps, one for fixing the stator by shrinkage fitting or press fitting, and the other for sealing a space between the motor case and the motor cover with the O-ring, it is necessary to reduce the works in view of workability. Further, it is known that a DC brushless motor which is often used for the electric motor vehicle has its performance greatly affected depending on the agreement or disagreement between a detector for detecting a position of a rotor and a circumferential position of the stator. And, because the stator which is once fixed can not be moved in the circumferential direction, a guide for positioning is needed to previously determine a position of the stator and to pinpointedly fix to the motor case. Therefore, it has drawbacks that the structure becomes complex and the manufacturing is difficult. And, when the stator is fixed at a position different from a predetermined position, there is a disadvantage tha the motor performance cannot be exhibited fully.

Then, the invention of this application has been completed to remedy the above drawbacks. Specifically, this invention, in an electric motor vehicle which has as the drive system a battery, a motor, and a controller for controlling the rotation of the motor, is characterized by fixing a stator between a motor case and a motor cover and sealing a space between the motor case and the motor cover with a filler.

Therefore, this invention remedies the above drawbacks and particularly retains sealing properties, enabling to prevent an insulation failure due to the entry of water into the motor. And, the above first point for safety, or a sudden stop of the electric motor vehicle, can be avoided.

A power transmission section of an electric motor vehicle has a high possibility to be exposed to wind and rain, and covered with dust or mud when the vehicle is running. Therefore, if a casing is not securely closed, there is the possibility of causing a failure in functional parts (contents) of a motor attached to a power transmission device and elements of the power transmission device. Consequently, it is an important issue haow a closing method is rationally realized. Sealing a part (output shaft) for taking out a turning force from a motor makes a structure complex, and using a contact type sealant results in a load, preventing an efficient transmission of power. And, for an electric motor vehicle, there is an issue how a motor for power is miniatureized. therefore, it is an important issue to rationally make arrangement and form of parts forming the motor.

Then, the invention of this application has been completed to remedy the above issues. Specifically, in an electric motor vehicle which has as the drive system a battery, a motor, and a controller for controlling the rotation of the motor this invention has characteristics that the power of the above motor is transmitted to a wheel through a power transmission mechanism, the motor is fixed at one end of a case for accommodating the power transmission mechanism, and a coupling section of the motor and the case is sealed by a sealant excepting passages of a motor output shaft and a motor wiring. Therefore, this invention remedies the above drawbacks and particularly retains sealing properties, enabling to prevent an insulation failure due to the entry of water into the motor. And, the above first point for safety, or a sudden stop of the electric motor vehicle, can be avoided.

BEST MODE FOR CARRYING OUT THE INVENTION

Figure 1:
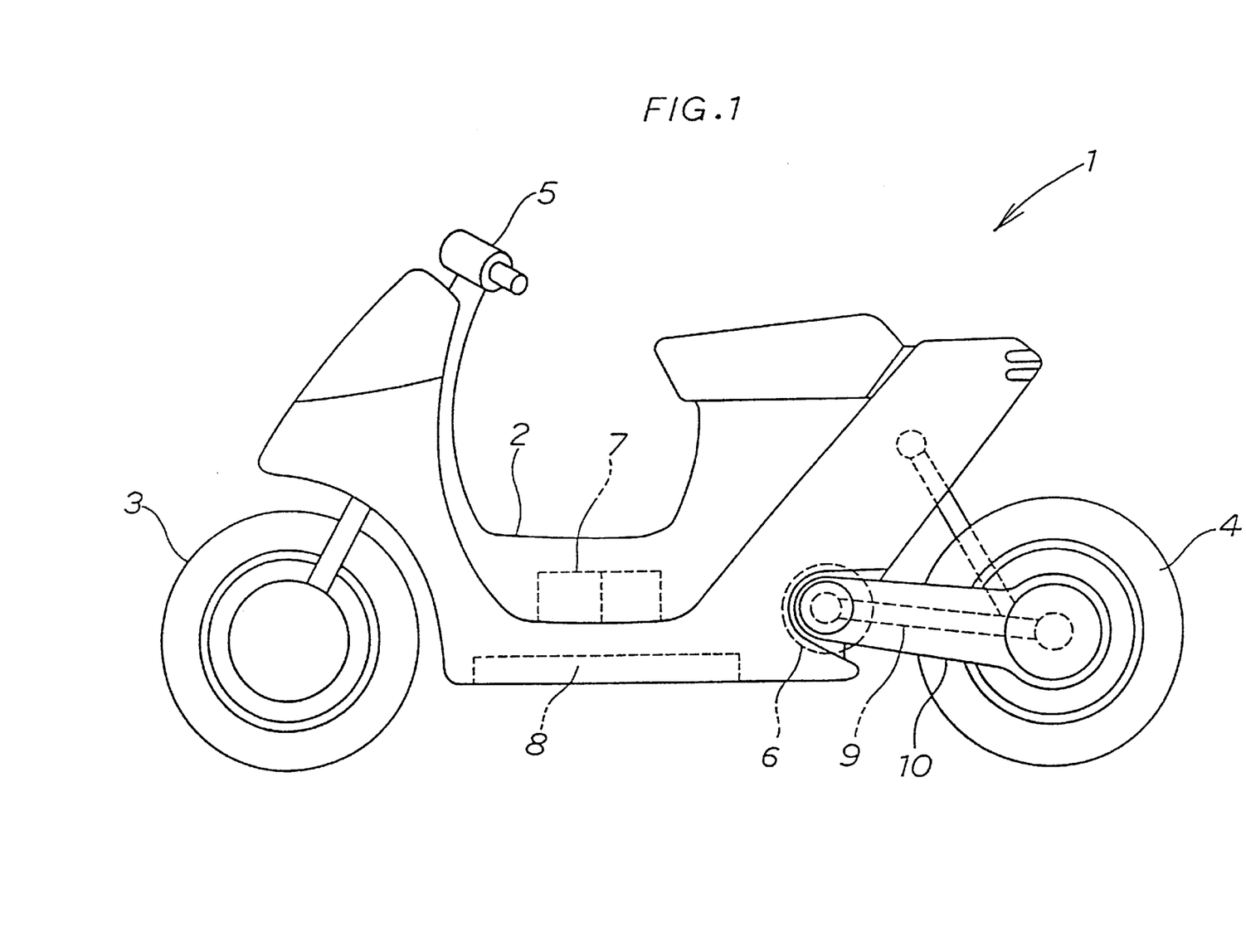
FIG. 1 is a side view of an electric two wheeler according to one embodiment of the electric motor vehicle.

FIG. 1 shows an electric two wheeler which is one embodiment of an electric motor vehicle. The invention will be described taking an electric two wheeler (including a scooter) as an example through the specification.

An electric two wheeler 1 has wheels 3, 4 at the front and the rear of a body 2 in the same way as a conventional two wheeler driven by an engine. The front wheel 3 is operated by a handle 5, and the rear wheel 4 is not driven by an engine but a motor 6.

The motor 6 is driven by a battery 7, and the motor rotation is controlled by a controller 8. In FIG. 1, though some are not shown, an accelerator grip and a brake lever disposed on the handle 5, a brake mechanism, a power transmission mechanism, a suspension and others may be same as those for conventional two wheelers.

Referring to FIG. 2 through FIG. 5, the first embodiment of the invention will be described.

Figure 2:
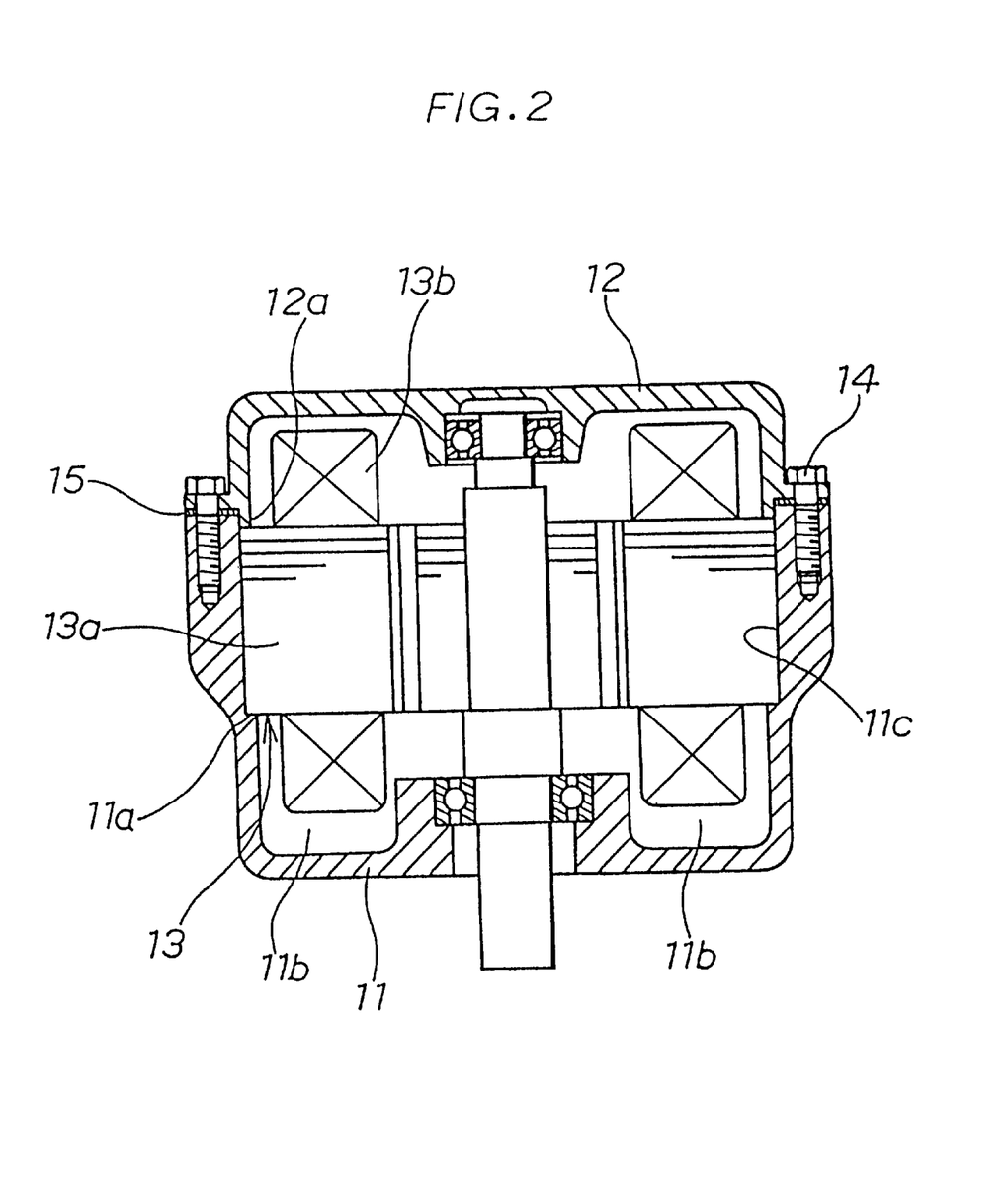
FIG. 2 is a vertical sectional view of a motor according to one embodiment of the invention.

In FIG. 2, a stator 13 is structured by winding a multiple-phased coil for driving a rotor on a stator core 13a which is made of tens of multilayered silicon steel plates having a circular hole large enough to accommodate the rotor therein and a slot for winding the coil. A part of the coil protruded from the stator core is called a coil end 13b.

A motor case 11 has a hollow section to clear the coil end 13b and a hollow section 11c to insert the stator 13, formed almost coaxial with the former. The hollow section 11b to clear the coil end has a smaller diameter than the hollow section 11c for inserting the stator, and a step 11a is formed at a boundary between the two hollow sections. The hollow section 11c for inserting the stator 13 has a diameter to fit with the outer circumference of the stator core 13a by "loose fitting" and a depth deeper than the axial length of the stator core 13a. Conventionally, to fix the stator to the motor case by shrinkage fitting or press fitting, the hollow section for inserting the stator had to be drilled precisely with respect to the outer diameter of the stator core. But, as the loose fitting is employed in this embodiment, the hollow section machining precision can be eased, thus simplifying the machining. And, the outer circumference of the motor case 11 has a plurality of tapped holes for joining to a motor cover 12.

The motor cover 12 has a ring projection 12a to press the end face of the stator core 13a. The ring projection 12a has an outer diameter for loose fitting with the hollow section 11c of the motor case 11 for inserting the stator, and an axial length of the projection 12a is sufficient so that the end face can be pressed even when the stator core 13a is multilayered to be short within a tolerance. And, a plurality of holes are formed in the outer circumference for inserting joining bolts to join with the motor case 11.

The stator core 13a is held between the step 11a and the projection 12a by means of a plurality of joining bolts 14, and as a result, the stator 13 is fixed between the motor case 11 and the motor cover 12. The stator core 13a is fitted to the hollow section 11c of the motor case 11 for inserting the stator 13 by loose fitting, so that the stator 13 can be moved in the circumferential direction within the motor case 11. Therefore, in case of a DC brushless motor whose performance is greatly affected by the circumferential positional relationship between the stator and a detector for detecting a position of a rotor, the inserted stator can be moved in the circumferential direction to determine a precise position with respect to the detector before fixing, thereby remedying the generation of a defective fixing of the stator. Specifically, in a conventional case, since the stator was fixed to the motor case by shrinkage fitting or press fitting, a later positional adjustment was quite difficult, and the fixing position of the stator was displaced. But, such a drawback can be removed by employing the above structure. And, since a filler 15 comprising a liquid packing such as a silicon sealant or a liquid gasket is applied in advance to between the motor case 11 and the motor cover 12, the filler 15 is crushed by tightening the joining bolts 14, satisfactorily sealing a space between the motor case 11 and the motor cover 12.

As described above, since the stator core 13a is produced by multilaying tens of silicon steel plates in the axial direction, a tolerance of the thickness of each silicon steel plate is accumulated, so that the length of the stator core in the axial direction has a difference of about 1 mm depending on if it is long or short.

Figure 3:
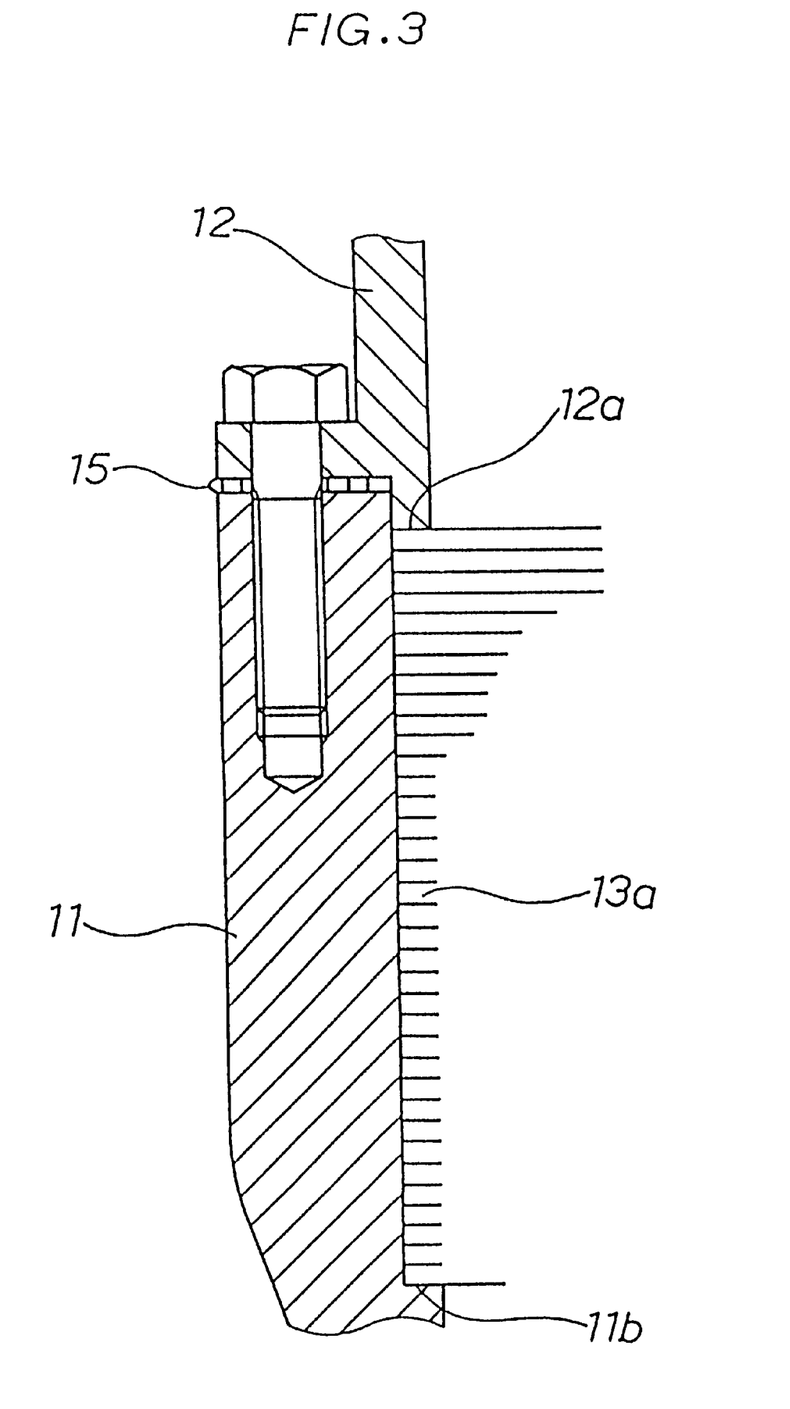
FIG. 3 is a partially enlarged view of a stator holding section with a short stator core showing one embodiment of the invention.

A state of a stator core sandwiching section where the axial length of the stator core is short will be described. FIG. 3 is a fragmentary enlarged view of the stator core sandwiching section, wherein the axial length of the stator core 13a is short. When the stator core 13a is short, the projection 12a does not come into contact to the end face of the stator core 13a, causing a problem that the stator core 13a cannot be pressed. To avoid such a problem, the axial length of the projection 12a is made to be relatively long. Specifically, the axial length of the projection 12a is designed such that the end face of the stator core 13a is pressed by the projection 12a and a space is formed between the motor case 11 and the motor cover 12 even when the stator core 13a is short.

Figure 4:
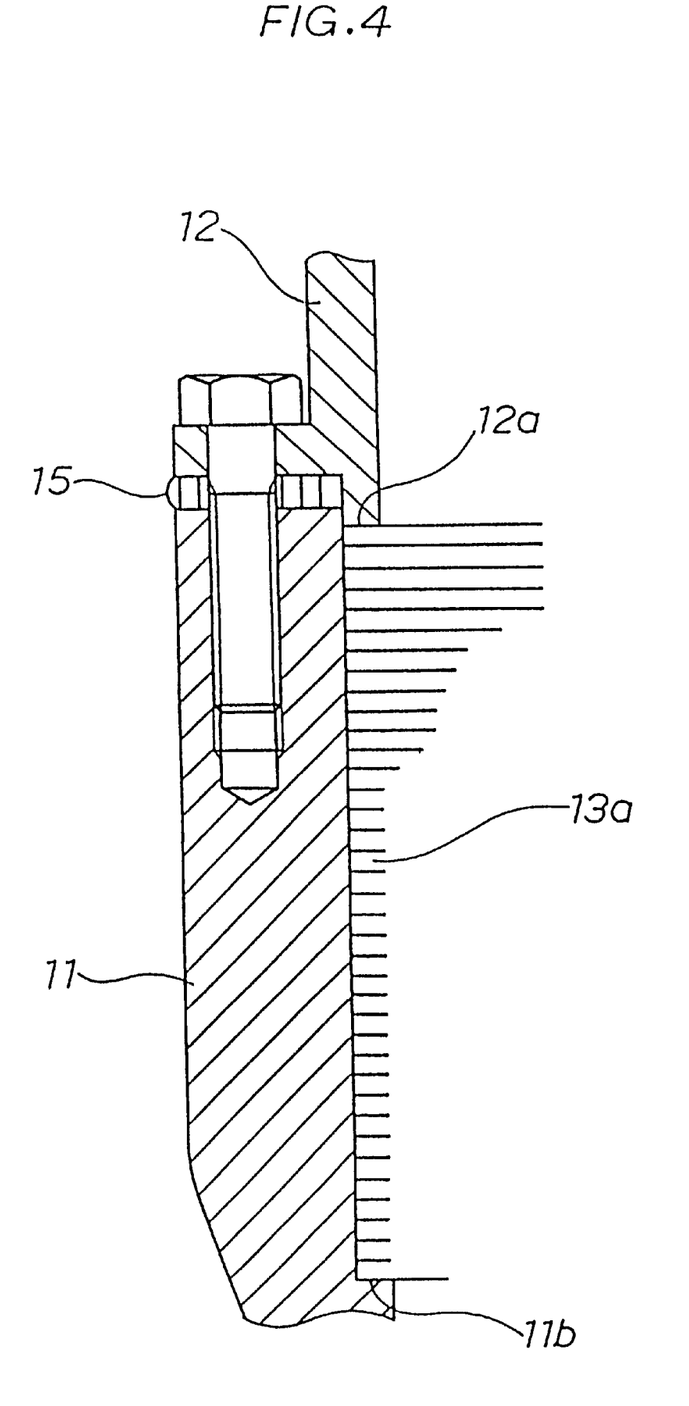
FIG. 4 is a partially enlarged view of a stator holding section with a long stator core showing another embodiment of the invention.

A state of the stator core sandwiching section when the axial length of the stator core is long will be described. FIG. 4 is a fragmentary enlarged view of the stator core sandwiching section, and the axial length of the stator core 13a is long. As described above, since the axial length of the projection 12a is designed to exhibit a pressing function even when the stator core 13a is short, when the stator core 13a is multilayered to be long in the axial direction, a space between the motor case 11 and the motor cover 12 is widened. When the space is so wide, a conventional O-ring cannot be crushed between the motor case 11 and the motor cover 12, and a sealing effect by the O-ring cannot be exhibited. But, using the filler 15, its filling amount can be varied depending on the width of the space, so that a sealing effect can be exhibited regardless of the width of the space.

Figure 5:
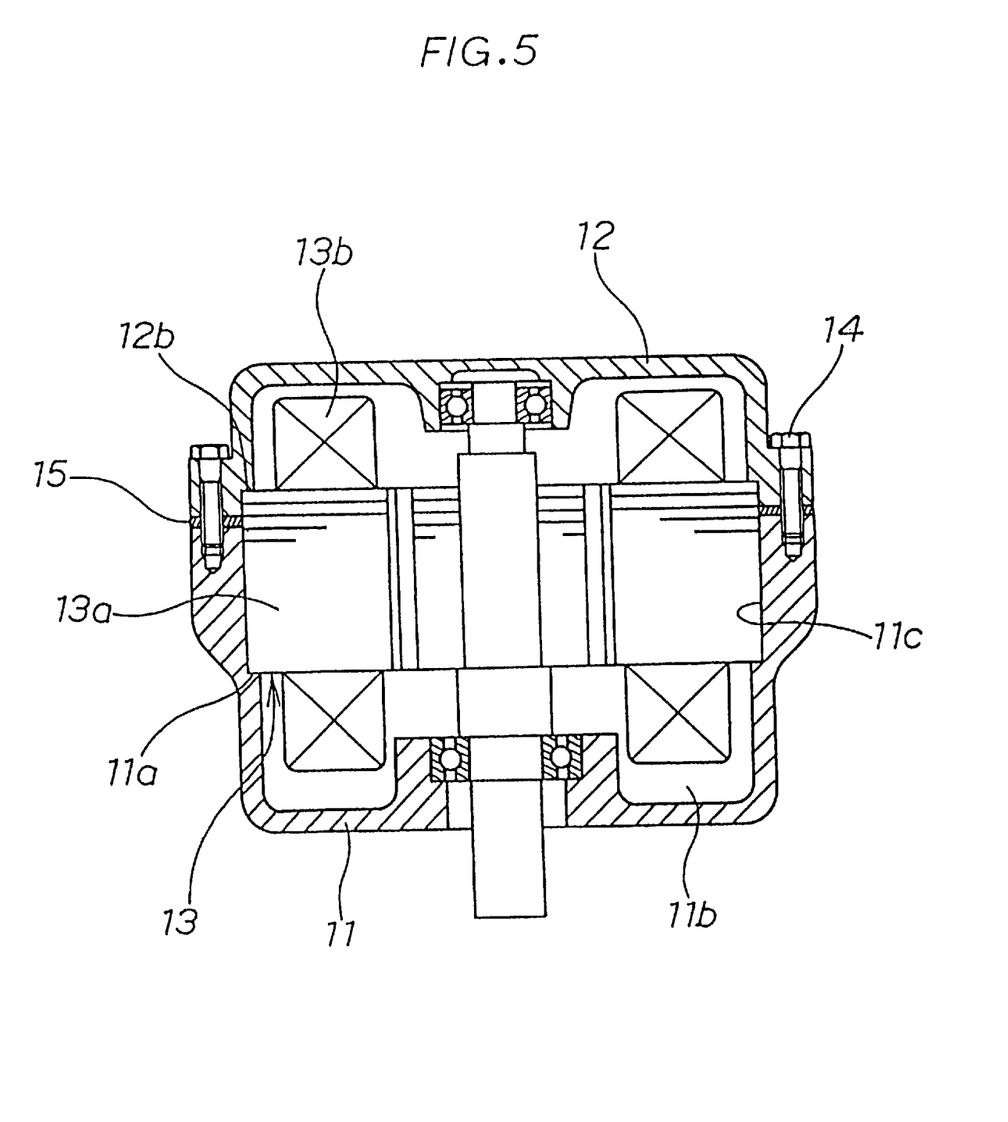
FIG. 5 is a vertical sectional view of a motor according to another embodiment of the invention.

FIG. 5 is another embodiment of the invention. In this embodiment, the common component elements with the above embodiment are given the same reference numerals and their detail description will be omitted. In FIG. 5, in the same way as the above embodiment, the stator 13 is fixed between the motor case 11 and the motor cover 12, and the filler 15 is applied to seal the space between the motor case 11 and the motor cover 12. In this case, in the motor cover 12, there are a hollow section to clear the coil end 13 and a hollow section for inserting the stator almost coaxially with the former, and a step 12a is formed at a boundary between the two hollow sections. And, the stator core 13a is held between the steps 11a, 12b and the stator 13 is fixed to the motor case 11 and the motor cover 12.

In this embodiment, since the filler 15 comprising a liquid packing such as a silicon sealant or a liquid gasket is also applied in advance to between the motor case 11 and the motor cover 12, the filler 15 is crushed by tightening the joining bolts 14, satisfactorily sealing a space between the motor case 11 and the motor cover 12. Since the filler 15 comes into contact with the stator core 13a, it shall not corrode the stator core 13a.

According to the invention, a sealing property is retained, so that an insulation failure due to the entry of water into the motor can be prevented. And, a sudden stop of the conventional electric motor vehicle due to an insulation failure can be prevented. Besides, according to the invention, a tolerance of the hollow section for inserting the stator 13 of the motor case can be increased, so that machining can be made easily. And, the fixing work of the stator 13 can be simplified, and the fixing of the stator 13 and the sealing of the motor case 11 can be made at the same time. Further, since the stator core 13a and the motor case 11 are engaged by loose fitting to allow the circumferential movement after inserting the stator 13, when this invention is applied to a DC brushless motor, the positional precision with respect to the detector can be attained, having an advantage of remedying a failure at fixing.

Back to FIG. 1, reference numeral 9 represents a power transmission mechanism, which is accommodated in a closed case 10 which is cast from an aluminum alloy. Further, in FIG. 6, a motor 6 having a casing structure cast from the aluminum alloy is fixed to one end of the case 10 by the joining bolts 14, and the rear wheel 4 is connected to a shaft supported by a bearing on the case 10 at another end. Power of the motor 6 is transmitted to the rear wheel 4 through the power transmission mechanism 9 to drive the rear wheel for traveling.

Figure 6:
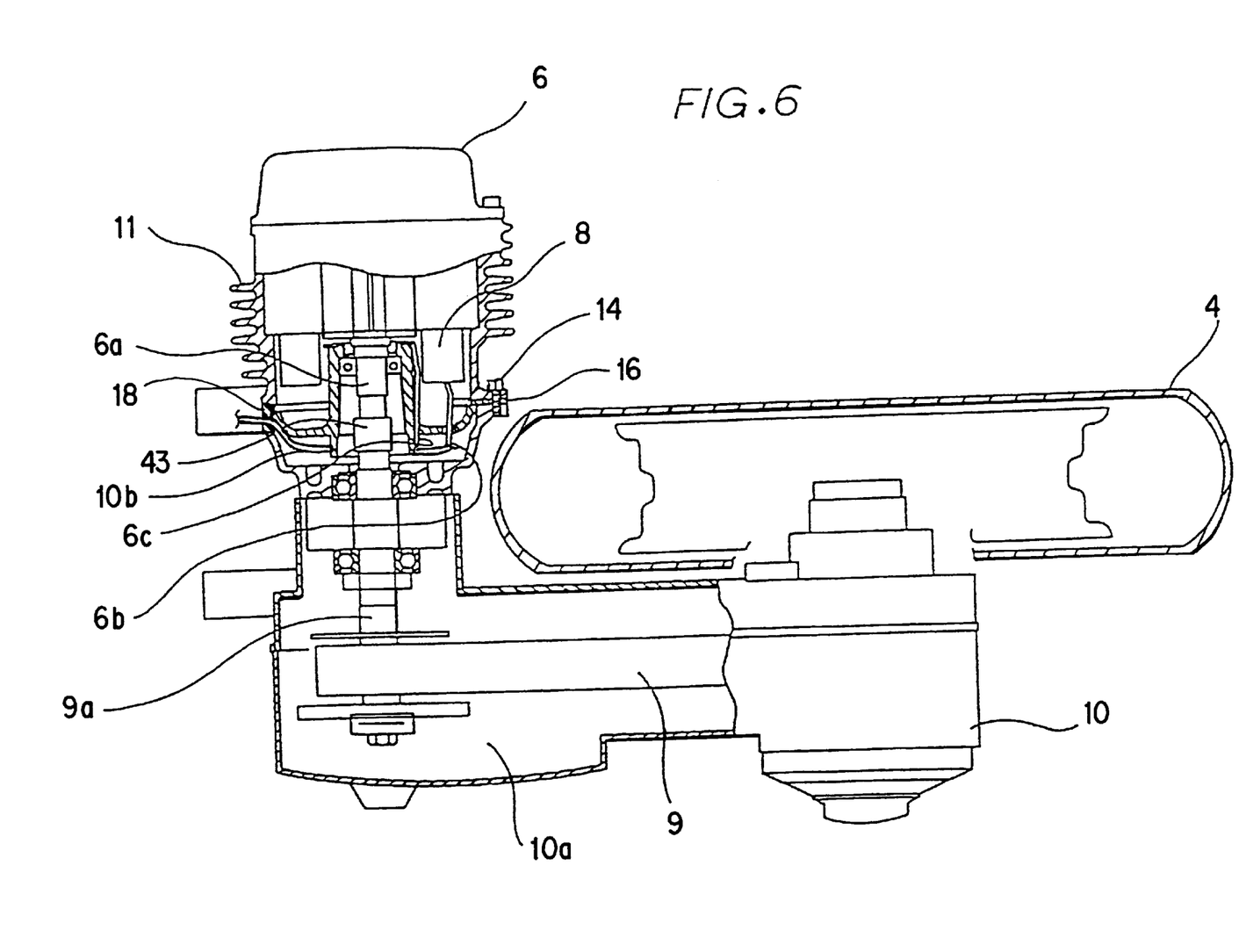
FIG. 6 is a sectional view showing a power transmission mechanism according to one embodiment of the invention.
Figure 7:
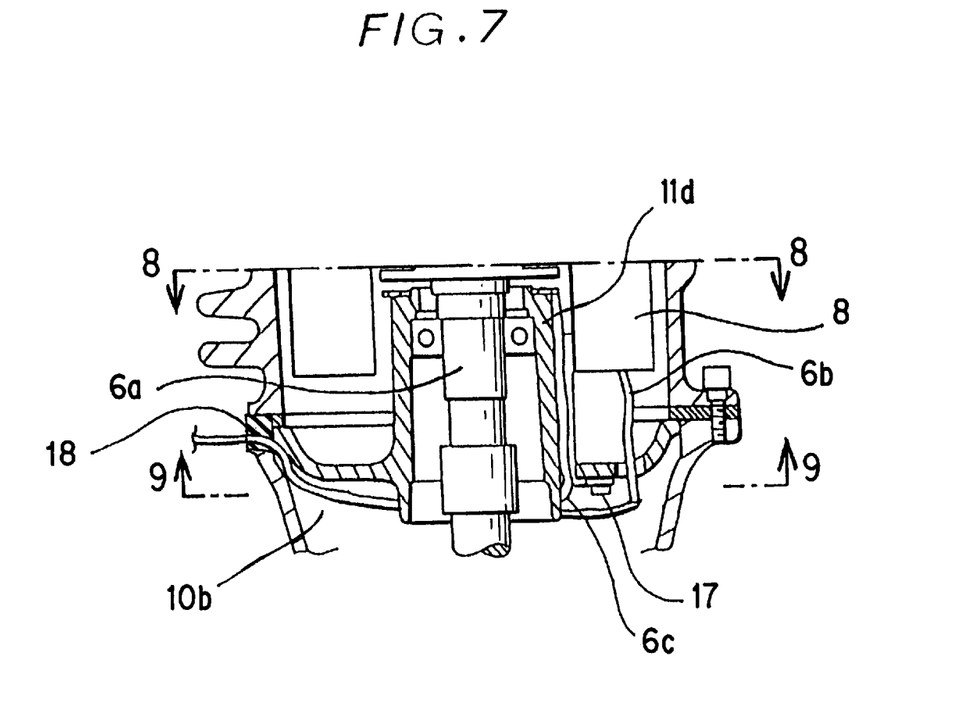
FIG. 7 is a sectional view showing the joining section of a motor case and a case for the power transmission mechanism according to one embodiment of the invention.
Figure 8:
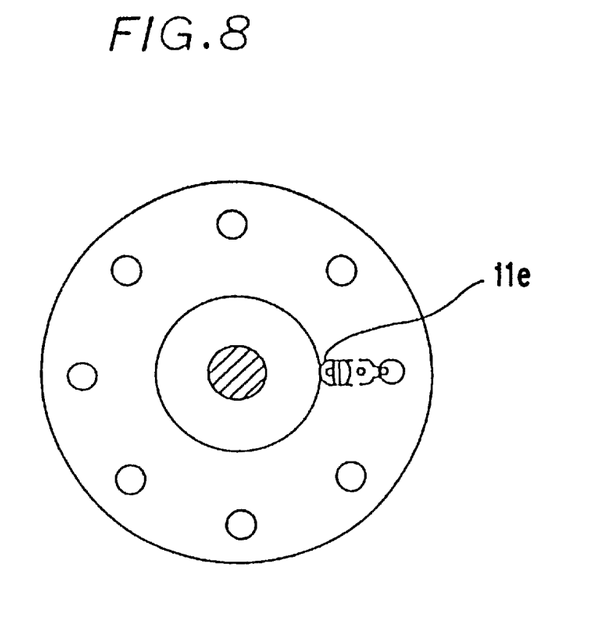
FIG. 8 is a view taken on line X—X of FIG. 7.
Figure 9:
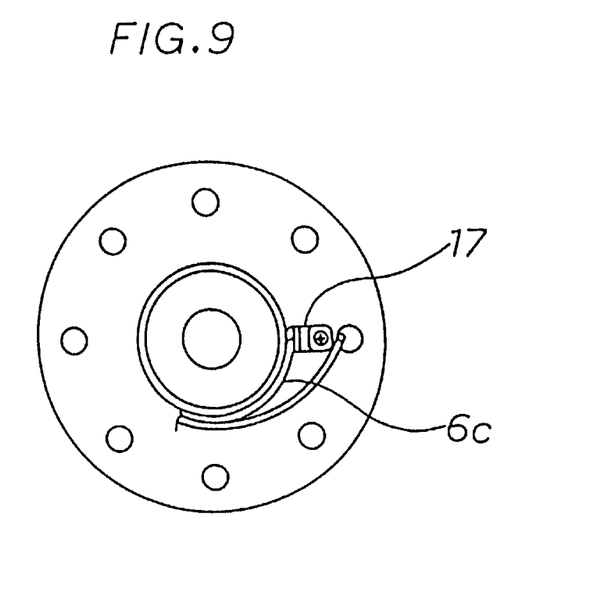
FIG. 9 is a view taken on line Y—Y of FIG. 7.
Figure 10:
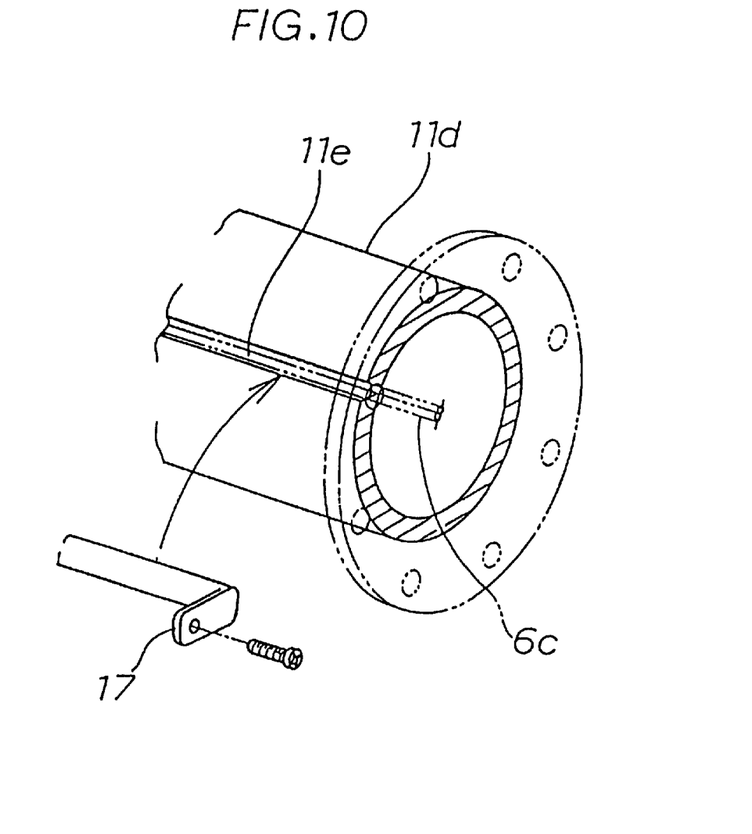
FIG. 10 is a perspective view showing a groove and a fixture of the motor case.

The motor 6 is fixed by the joining bolts 14 with a liquid sealant 16 therebetween. Specifically, the sealant 16 is applied to the entire periphery of the joint portion of the case 10 and the motor case 11, then the joining bolts 14 arranged at equal intervals are tightened. The case 10 accommodates the power transmission mechanism 9 which comprises a belt, a pulley, a centrifugal clutch, and gears. And, on the side fixing the motor 6 in the case 10, an input shaft 9a connected to an output shaft 6a of the motor is supported by a bearing of the case 10. And, the fitting portions of the motor case 11 and the case 10 are machined to be smooth so that they are easily sealed by the sealant 16.

The case 10 for accommodating the power transmission mechanism 9 has an oil seal disposed on the bearing of the shaft connected to the rear wheel, and the hollow section 10a has a closed structure. The hollow section 10b which is formed by the case 10, the motor case 11 and the sealant 16 is engaged with the hollow section 10a to form a closed chamber. And, a wiring 6b and a sensor wiring 6c of the motor 6 are pulled out in the same direction as the output shaft, and lead to the hollow section 10b. Therefore, without providing a special sealing structure for the outlet sections of the motor case 11 for the output shaft 6a of the motor 6, the wiring 6b and the sensor wiring 6c, the hollow section 10a and the hollow section 10b are securely sealed when the case 10 and the motor 6 are assembled, remedying a failure which may be caused by dust or mud. An insulation failure due to the entry of water into the motor can be avoided, and a sudden stop of the electric motor vehicle due to an insulation failure in conventional cases can be prevented. And, since the output shaft 6a does not need the sealing mechanism such as an oil seal for the motor case 11 (bearing section), the motor 6 suffers from little power loss, and an efficient motor is provided. Further, among the parts forming the motor, a sealing mechanism part is not needed. Therefore, the number of parts can be reduced, and assembling can be made easily. In this embodiment, the sealant is of a liquid type, but a solid sealant may be used.

And the motor wiring 6b and the sensor wiring 6c taken out into the hollow section 10b are bent within the hollow section 10b and pulled out from the connection section of the case 10 and the motor 6 through a grommet 18. The grommet 18 is made of silicon rubber and has a hole having the same diameter with those of the wiring 6b and the sensor wiring 6c formed, and the closed structure of the hollow section 10b is secured because the wiring is passed through the above hole.

FIG. 7 through FIG. 10 are explanatory views of laying and fixing of the sensor wiring. In these drawings, on a wall face 11d of the outer periphery of the bearing supporting section which is integrally formed with the motor case 11, a U-shaped groove 11e is formed in parallel with the motor case, and the sensor wiring 6c within the motor 6 is laid in the U-shaped groove 11e. The sensor wiring 6c is held between a fixture 17 and the groove 11e, passed through a narrow space between the output shaft 6a and the coil 8 of the stator, and pulled outside of the case 11 in parallel with the output shaft 6a. Therefore, since the wirings 6b, 6c are pulled out of the motor 6 without bending within the motor case 11, the wiring can be laid efficiently, and the outside shape of the motor can be minimized. The fixture 17 has its end fixed to the motor case 11 by means of a bolt, pressing the sensor wiring 6c against the groove 11e with its plate section having elasticity in parallel with the output shaft 6a.

And, the wirings 6b, 6c which are pulled out in parallel with the output shaft 6a are formed so as to be laid on the outer periphery of the wall face 11d. Therefore, the wirings 6b, 6c of the motor pulled out in the same direction with the output shaft 6a are completely separated from the output shaft 6a with the wall face 11d as a partition. They can be laid without forcedly bending. The wiring assembling work is simple, and any damage to the wirings due to the output shaft 6a can be prevented. Thus, a highly reliable motor for the electric motor vehicle can be provided.

Industrial Applicability

The inventions described above can be utilized for the holding and maintenance of motors and controllers for the electric motor vehicles using a motor, particularly for two wheelers and three wheelers such as motorcycles and scooters, and for the improvement of safety of electric motor vehicles.

We claim:

1. An electric motor vehicle having as a drive system a battery, a motor having an output shaft and a motor wiring, and a controller for controlling rotation of the motor, comprising:

a motor case having a first bearing support section;

a power transmission case having a second bearing support section and connected to said motor case via a seal member so as to define a closed hollow section with said first bearing support section of said motor case; and a wire holding member made from an elastic material and provided in said closed hollow section through which said motor wiring is taken out.

2. An electric motor vehicle according to claim 1, wherein a rib-like wall face is integrally formed with the motor case around the output shaft of the motor, and the motor wiring is arranged on the outer side of said case to isolate the output shaft from the motor wiring.

3. An electric motor vehicle according to claim 1, wherein the output shaft of said motor is positioned within the motor case.

4. An electric motor vehicle having as a drive system a battery, a motor having a motor output shaft and a motor wiring, and a controller for controlling rotation of the motor, comprising:

a power transmission mechanism for transmitting power of said motor to a wheel, a case for accommodating said power transmission mechanism to one end of which said motor is fixed at a coupling section of said motor and said case, a sealant provided at said coupling section for seal excepting passages for said motor output shaft and said motor wiring, a U-shaped groove formed in an outer side of the case in parallel with the output shaft, a sensor wiring within the motor laid in said U-shaped groove, an L-shaped elastic fixture having a first section fixed to said case with a fastener and a second section extending in parallel to said U-shaped groove from and at right angles with said first section for holding said sensor wiring in said U-shaped groove so that said sensor wiring is pulled out of the motor in the same direction as said output shaft.

* * * * *